US012637608B2

(12) United States Patent
Alanqari et al.

(10) Patent No.: US 12,637,608 B2
(45) Date of Patent: May 26, 2026

(54) DEVELOPMENT OF GEOPOLYMER CEMENTS UTILIZING RED MUD FOR PRIMARY WELL CEMENTING APPLICATIONS

(71) Applicant: SAUDI ARABIAN OIL COMPANY, Dhahran (SA)

(72) Inventors: Khawlah A. Alanqari, Al Khobar (SA); Abdullah Al-Yami, Dhahran (SA); Mohammad Alharthi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/774,108

(22) Filed: Jul. 16, 2024

(65) Prior Publication Data

US 2026/0022288 A1     Jan. 22, 2026

(51) Int. Cl.
*C09K 8/46* (2006.01)
*C04B 12/00* (2006.01)
*C04B 28/00* (2006.01)

(52) U.S. Cl.
CPC .............. *C09K 8/46* (2013.01); *C04B 12/005* (2013.01); *C04B 28/006* (2013.01)

(58) Field of Classification Search
None
See application file for complete search history.

(56) References Cited

U.S. PATENT DOCUMENTS 7,794,537 B2    9/2010    Barlet-Gouedard et al.
7,846,250 B2    12/2010    Barlet-Gouedard et al.

9,222,010 B2    12/2015    Porcherie et al.
9,321,687 B2    4/2016    Gupta et al.
9,394,202 B2    7/2016    Porcherie et al.
9,890,082 B2    2/2018    Dubey
10,017,418 B2    7/2018    Thomas et al.
10,112,869 B2    10/2018    Agapiou (Continued)

FOREIGN PATENT DOCUMENTS

CN        109336456 B    4/2020
CN        112551958 A    3/2021

(Continued)

OTHER PUBLICATIONS

Mendes, Beatryz et al., "Assessment of mechanical and microstructural properties of geopolymers produced from metakaolin, silica fume, and red mud"; International Journal of Applied Ceramic Technology; vol. 18, Issue 1; pp. 1-13; Jan./Feb. 2021 (13 pages).

(Continued)

*Primary Examiner* — Anuradha Ahuja
(74) *Attorney, Agent, or Firm* — Osha Bergman Watanabe & Burton LLP

(57) ABSTRACT

A composition and method for well cementing are provided. The composition comprises a geopolymer slurry that is prepared by mixing a particulate material comprising ground red mud, an alkaline activator, an aqueous solvent, and a $SiO_2$ source material added to produce a geopolymer slurry with a Si/Al ratio of from 2 to 6. The method for well cementing includes pumping a geopolymer slurry into a location to be cemented and hardening the geopolymer slurry to form a cement.

7 Claims, 1 Drawing Sheet

Obtain red mud from industrial waste processes.

Manually grind red mud to a fine particle size.

Prepare sodium silicate such that the $SiO_2:Na_2O$ molar ratio is 3.4:1, with a pH of 12-13.

Mix the sodium silicate with an aqueous solvent to form an alkaline activator.

Add the red mud to the alkaline activator such that the solution is 10 to 70% water by weight of red mud.

Add a $SiO_2$ source material such that the final $SiO_2:Al_2O_3$ ratio is 2 to 6.

Mix to obtain a geopolymer slurry.

Pump the geopolymer slurry into a location to be cemented.

Harden the geopolymer slurry to form a cement.

(56)        References Cited

U.S. PATENT DOCUMENTS

| | | | |
|---|---|---|---|
| 10,113,389 B2 | 10/2018 | Pandey et al. | |
| 11,472,741 B2 | 10/2022 | Sampson | |
| 2007/0125272 A1 | 6/2007 | Johnson | |
| 2008/0028994 A1* | 2/2008 | Barlet-Gouedard | .......................... C04B 28/006 106/790 |
| 2008/0028995 A1 | 2/2008 | Barlet-Gouedard et al. | |
| 2017/0306211 A1* | 10/2017 | Pisklak | ................... E21B 33/14 |
| 2017/0369762 A1* | 12/2017 | Martinez | ............... C04B 24/003 |
| 2023/0174870 A1* | 6/2023 | Presley | .................... C10G 1/10 585/241 |
| 2023/0416592 A1* | 12/2023 | Yakovlev | .............. C04B 28/006 |

FOREIGN PATENT DOCUMENTS

| | | | | |
|---|---|---|---|---|
| CN | 113735515 A | 12/2021 | | |
| KR | 101749831 B1 | 6/2017 | | |
| WO | WO2008017414 | * | 2/2008 | .............. C09K 8/42 |
| WO | 2020097693 A1 | 5/2020 | | |
| WO | 2023/283432 A1 | 1/2023 | | |

OTHER PUBLICATIONS

International Search Report issued in Application No. PCT/US2025/037665, mailed on Nov. 7, 2025 (14 pages).

* cited by examiner

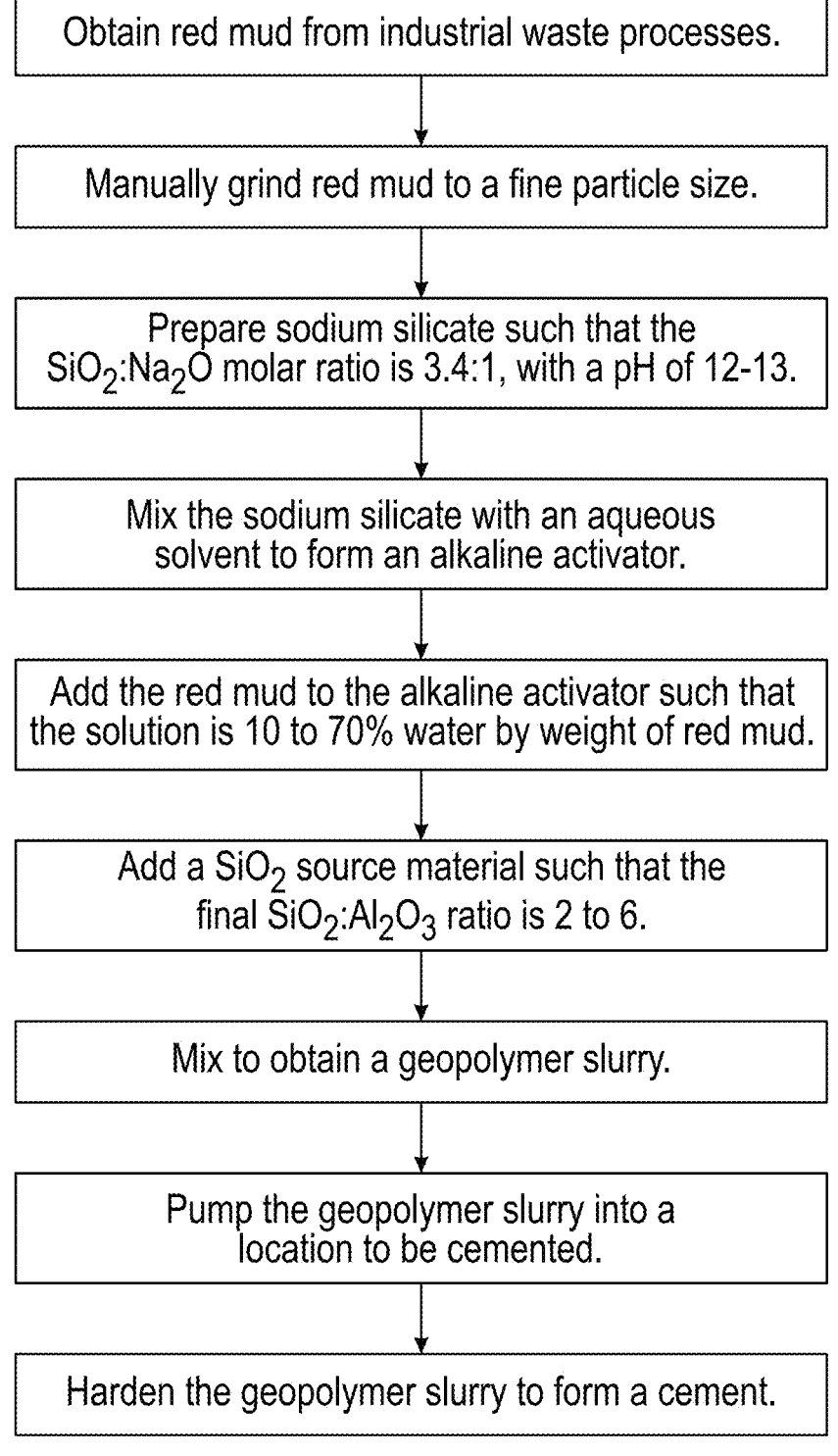

Obtain red mud from industrial waste processes.

Manually grind red mud to a fine particle size.

Prepare sodium silicate such that the $SiO_2:Na_2O$ molar ratio is 3.4:1, with a pH of 12-13.

Mix the sodium silicate with an aqueous solvent to form an alkaline activator.

Add the red mud to the alkaline activator such that the solution is 10 to 70% water by weight of red mud.

Add a $SiO_2$ source material such that the final $SiO_2:Al_2O_3$ ratio is 2 to 6.

Mix to obtain a geopolymer slurry.

Pump the geopolymer slurry into a location to be cemented.

Harden the geopolymer slurry to form a cement.

DEVELOPMENT OF GEOPOLYMER CEMENTS UTILIZING RED MUD FOR PRIMARY WELL CEMENTING APPLICATIONS

BACKGROUND

Cement mixtures are used in the oil and gas industry for cementing oil and gas wells. For example, cement may be used to hold casing in place and prevent fluid migration between subsurface formations. Primary cementing includes pumping cement down a casing and into an annulus between the formation and the casing (or between casings). Cements used in the oil and gas industry must be able to withstand the extreme temperatures, pressures and chemical environments encountered in hydrocarbon-bearing formations. Thus, there exists a need to produce well cements capable of withstanding down-hole environments.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition for well cementing comprising a geopolymer slurry. The composition may be prepared by mixing a particulate material derived from red mud, an alkaline activator, an aqueous solvent, and a $SiO_2$ source material present in an amount to produce a Si/Al ratio in the geopolymer slurry of from 2 to 6.

In another aspect, embodiments disclosed herein relate to a method of cementing. The method may include pumping a geopolymer slurry into a location to be cemented and hardening the geopolymer slurry to form a cement. The method may also include where the geopolymer slurry consists of a particulate material derived from red mud, an alkaline activator, an aqueous solvent, and a $SiO_2$ source material present in an amount to produce a Si/Al ratio in the geopolymer slurry of from 2 to 6.

Other aspects and advantages of the claimed subject matter will be apparent from the following description and the appended claims.

BRIEF DESCRIPTION OF DRAWINGS

The FIGURE is a block-flow diagram of a method of well cementing in accordance with one or more embodiments of the present disclosure.

DETAILED DESCRIPTION

The present disclosure generally relates to a geopolymer slurry and a method of cementing that includes delivering the geopolymer slurry to a location to be cemented. The cementing may be primary well cementing and may involve a reduced amount of $CO_2$ associated with cement formation. The geopolymer slurry is based on red mud. The red mud may be obtained from industrial waste. The present disclosure further relates to a method of converting red mud chemically into a geopolymer to be used in the geopolymer slurry. Thus, one or more embodiments in accordance with the present disclosure provide an effective solution for recycling red mud and for reducing the amount of $CO_2$ associated with cement formation.

In one aspect, embodiments of the present disclosure relate to a geopolymer slurry including a particulate material derived from red mud. Red mud is also known as bauxite residue. Red mud is an industrial waste by-product that is produced during the production of alumina using industrial processes such as the Bayer process. The Bayer process produces one to two tons of red mud for every one ton of alumina produced. Over 175 million tons of red mud are produced globally. Red mud is highly basic, with a highly alkaline pH ranging from 10 to 12. Both the pH and the composition of red mud tend to be regarded as environmentally damaging. However, utilization of red mud to generate value-added products allows for the attainment of more green and sustainable industrial processes.

Red mud has a composition that includes a mixture of minerals. The mineral includes metallic oxides. Exemplary minerals that may be present in the waste red mud include $Al_2O_3$, $SiO_2$, CaO, MgO, $K_2O$, larnite ($Ca_2(SiO_4)$), cancrinite ($(NaCa)_8(AlSiO_4)_6(CO_3SO_4)_2 \cdot 2H_2O$), hematite ($Fe_2O_3$), goethite (FeO(OH)), calcite ($CaCO_3$), perovskite ($CaTiO_3$), grossite ($CaAl_4O_7$), quartz ($SiO_2$), gibbsite ($Al(OH)_3$), and combinations thereof. The mineralogical composition of the red mud may be determined by X-ray powder diffraction (XRD). In one or more embodiments, the elemental composition of the red mud contains one or more elements that include Fe, Al, Na, Si, Ca, Ti, S, Zn, Sr, Mg, P, Cr, K, Mn, Ce, Pb, Ni, Th, and combinations thereof. The elemental composition of the red mud may be determined by XRD.

A suitable red mud as a basis for the present geopolymer includes $Al_2O_3$, and $SiO_2$. The red mud may contain $Al_2O_3$ and $SiO_2$ in a Si/Al molar ratio of from 0.5 to 0.7, for example from 0.50 to 0.63. The oxides in the mixture may be solid and the mixture may be solid. In one or more embodiments of the present disclosure, the red mud is ground to a fine particle size prior to use in the geopolymer slurry. The fine particle size of the ground red mud may be characterized by 80% of the particles being smaller than 50 μm. The particle size may be determined by known methods such as sieving to determine a mesh size and/or by imaging to visualize the particles.

The geopolymer slurry may be prepared by mixing a particulate material derived from red mud; an alkaline activator; an aqueous solvent; and a $SiO_2$ source material added in an amount to produce a Si/Al ratio in the geopolymer slurry of a lower limit of any one of 2 and 4 and an upper limit of any one of 4 or 6, where any lower limit can be paired with any mathematically compatible upper limit. The present inventors have discovered that red mud can be utilized as an aluminosilicate source material for the preparation of geopolymers through a geopolymerization reaction. The geopolymerization reaction involves first a dissolution of silicon and aluminum oxide species under alkaline conditions, followed by a polycondensation reaction to form a gel. The dissolution of silicon and aluminum oxide species under alkaline conditions may form mixed hydroxyl ions. The polycondensation reaction may be a polycondesation reaction of the mixed hydroxyl ions to form the final gel as a 3D chain with a tetrahedral structure that is composed of silicate and aluminate linked to each other through oxygen atoms. The composition of the gel may be described using the following equation:

$$Na_n[(-SiO_2)_z-AlO_2]_n \cdot yH_2O \tag{1}$$

3 where n is the degree of polymerization, z may be 2, 3, 4, or higher depending on the amount of soluble silicate present in the polymerization, and y represents coordinated waters.

In one or more embodiments of the present disclosure, the alkaline activator is a mixture of sodium silicate and sodium hydroxide. The pH of the sodium silicate may range from 11 to 13, depending on the $SiO_2:Na_2O$ molar ratio. The $SiO_2$:$Na_2O$ molar ratio of the present disclosure may be 3.4:1, resulting in a pH of 12-13.

In one or more embodiments of the present disclosure, the aqueous solvent includes one or more waters such as deionized water, tap water, fresh water, municipal water, formation water, produced water, well water, filtered water, distilled water, sea water, or combinations thereof. The aqueous solvent may include one or more organic or inorganic compounds dissolved in the water or otherwise completely miscible with the one or more waters. The aqueous solvent may include salt water, natural, or synthetic brines. Suitable salts may include alkali metal chlorides, hydroxides, or carboxylates. For example, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations thereof.

Without being bound by any theory, the density of the geopolymer slurry may be varied by incorporating salts or organic compounds into the aqueous solvent. Increasing the saturation of the aqueous solvent by increasing the salt concentration or amount of dissolved organics may increase the density of the aqueous solvent, and thus, the density of the geopolymer slurry.

In one or more embodiments, the geopolymer slurry includes the aqueous solvent in a range of from 10 to 70 wt %, based on the weight of the red mud. In one or more embodiments, the geopolymer slurry includes the aqueous solvent in a range of from 10 to 40 wt %, from 10 to 30 wt %, from 10 to 20 wt %, from 20 to 40 wt %, from 25 to 35 wt %, or from 20 to 30 wt % based on the weight of the red mud.

In one or more embodiments, the $SiO_2$ source material is silica fume. The $SiO_2$ source material may be cement. The source material may be fine material. For example, the source material may be fine sand. Fine sand is commercially available. Fine sand may be provided with a predetermined sieve size range. For example, the size range may be provided as a sieve size. Fine sand may be a sieve size from sieve size #30 (30 mesh) to sieve size #100 (100 mesh). Thus, for example when the sieve size is 100 mesh, the fine sand may have an average particle size of less than 150 μm. The source material may be nanosilica. Nanosilica is commercially available. Nanosilica may be provided in a predetermined average size. For example, the average size may be a predetermined average size within the range from 1 nanometers to 200 nanometers, with an approximate distribution width with the range of from 2% to 20%. When the $SiO_2$ source is cement, the $SiO_2$ may be present in amounts up to 0.1 to 50 wt. %. In one or more embodiment, the geopolymerization reaction does not use any source of Ordinary Portland Cement (OPC).

In one or more embodiments of the present disclosure, the mixture used to form the geopolymer slurry includes other one or more additives known to be suitable for cement slurries. The one or more additives may include accelerators, retarders, extenders, weighting agents, fluid loss control agents, lost circulation control agents, surfactants, antifoaming agents, specialty additives such as elastomers or fibers, and combinations thereof. The one or more additives do not include Saudi Arabian volcanic ash.

The composition of the red mud, the alkaline activator, the aqueous solvent, and the $SiO_2$ source material and optional components may be stirred for a sufficient amount of time in order to achieve suitable homogeneity. That is, the mixing may include stirring for a sufficient amount of time in order to achieve suitable homogeneity. The composition may be stirred according to methods known in the art, such as, for example, with an API blender. A sufficient amount of time may range from about 15 seconds to about 1 minute. For example, the solution may be stirred for an amount of time ranging from a lower limit of one of 15 seconds at 4,000 rpm, to an upper limit of 35 seconds at 12,000 rpm. The sufficient amount of mixing time may be determined according to the following equation:

$$\frac{E}{M} = \frac{k\omega^2 t}{V} \tag{2}$$

where E corresponds to mixing energy in kJ, M corresponds to the mass of the geopolymer slurry in kg, k=$6.1\times10^{-8}$ m⁵/s, ω corresponds to rotational speed in radians per second, t corresponds to mixing time in seconds, and V corresponds to volume of the geopolymer slurry in m³.

In one or more embodiments of the present disclosure, the geopolymer slurry has a thickening time at a temperature greater than or equal to 100° F. of greater than 1, 1.5, 1.75, 2, 4, 6, 8, or 10 hours. In one or more embodiments, the thickening time is be decreased by increasing the temperature to greater than 180° F. A thickening time test may be used to simulate pumping conditions in order to determine the length of time before the geopolymer slurry becomes difficult or impossible to pump. Thickening time is determined via a pressurized consistometer. This device allows pressure and temperature to be applied to a cement slurry while it is being stirred (typically at 150 rpm). A resistor arm on a potentiometer indicates resistance to the paddle turning as the cement sets. The apparatus is calibrated to a standard output in Bearden Consistency units. The device is fully automated and can simulate squeeze schedules and/or batch mixing.

In one or more embodiments of the present disclosure, the geopolymer slurry has a density of from 70 to 170 lb/ft³ as determined by a pressurized fluid density scale.

In one or more embodiments of the present disclosure, the viscosity of the geopolymer slurry is measured using a standard oilfield viscometer, such as a FANN® Model 35 viscometer manufactured by Fann Instrument Company, for example, according to test methods provided in the API Recommended Practice for Field Testing Water-Based Cement Slurries (RP 13B-1/ISO 10414-1:2002). The viscometer reports shear stress readings at various shear rates. The shear stress readings are reported in units of pounds of force per 100 square feet (lbf/100 ft²) and are measured in rpm. The viscometer may report shear stress readings at shear rates of at least one of 600 rpm, 300 rpm, 200 rpm, 100 rpm, 6 rpm, or 3 rpm. According to one or more embodiments of the present disclosure, these shear stress readings are used to determine the viscosity of the geopolymer slurry at any of the shear rates, using Equation 3, assuming a viscometer with an R1 rotor sleeve, B1 bob, and F1 torsion spring:

$$\mu = \frac{300}{N}\theta_N \qquad (3)$$

where $\mu$ corresponds to the viscosity in cP, N corresponds to the viscometer shear rate in rpm, and $\theta_N$ corresponds to the viscometer shear stress in lbf/100 ft$^2$.

In one or more embodiments of the present disclosure, the rheology of geopolymer slurry is modeled based on Bingham plastic flow behavior. The rheological behavior of the geopolymer slurry may be determined by measuring the shear stress on the geopolymer slurry at different shear rates, which may be accomplished by measuring the shear stress and/or shear rate on the geopolymer slurry using a FANN® Model 35 viscometer operated at 3 rpm, 6 rpm, 100 rpm, 200 rpm, 300 rpm, or 600 rpm, for example. A Bingham plastic fluid may then be modeled using the following equation:

$$\tau = (PV)\dot{\gamma} + 4.79YP \qquad (4)$$

where $\tau$ corresponds to shear stress in dynes per square centimeter, PV corresponds to plastic viscosity in cP, $\dot{\gamma}$ corresponds to shear rate in s$^{-1}$, and YP corresponds to yield point in lbf/100 ft$^2$.

The rheology of the geopolymer slurry may be evaluated from the plastic viscosity (PV) and the yield point (YP), which are parameters from the Bingham plastic rheology model. The plastic viscosity is related to the resistance of the geopolymer slurry to flow due to mechanical interaction between the solids of the geopolymer slurry and represents the viscosity of the geopolymer slurry extrapolated to infinite shear rate. In other words, the plastic viscosity is the slope of the shear stress versus shear rate curve of the Bingham plastic model. The plastic viscosity reflects the type and concentration of the solids in the geopolymer slurry, and a lesser plastic viscosity is preferred. In one or more embodiments, the plastic viscosity of the geopolymer slurry is estimated by measuring the shear stress of the geopolymer slurry using a FANN® Model 35 viscometer at shear rates of 300 rpm and 600 rpm and subtracting the 300 rpm shear stress measurement from the 600 rpm shear stress measurement according to the following equation:

$$PV = \theta_{600} - \theta_{300} \qquad (5)$$

where PV corresponds to plastic viscosity in cl, $\theta_{600}$ corresponds to the shear stress viscometer reading at 600 rpm in lbf/100 ft$^2$, and $\theta_{300}$ corresponds to the shear stress viscometer reading at 300 rpm in lbf/100 ft$^2$.

In one or more embodiments of the present disclosure, the geopolymer slurry has a plastic viscosity of from 40 to 350 cP. The plastic viscosity of the geopolymer slurry may be determined according to test methods provided in the API Recommended Practice For Field Testing Water-Based Cement slurries (RP 13B-1/ISO 10414-1:2002). The geopolymer slurry may have a plastic viscosity of from 50 to 350 cP, from 50 to 300 cP, from 50 to 200 cP, from 50 to 150 cP, from 50 to 125 cP, from 50 to 100 cP, from 50 to 80 cP, from 50 to 60 cP, from 60 to 350 cP, from 60 to 300 cP, from 60 to 200 cP, from 60 to 150 cP, from 60 to 125 cP, from 60 to 100 cP, from 60 to 80 cP, from 80 to 350 cP, from 80 to 300 cP, from 80 to 200 cP, from 80 to 150 cP, from 80 to 125 cP, from 80 to 100 cP, from 100 to 350 cP, from 100 to 300 cP, from 100 to 200 cP, from 100 to 150 cP, from 100 to 125 cP, from 100 to 100 cP, from 100 to 80 cP, from 125 to 350 cP, from 125 to 300 cP, from 125 to 200 cP, from 125 to 150 cP, from 150 to 350 cP, from 150 to 300 cP, from 150 to 200 cP, from 200 to 300 cP, from 200 to 350 cP, or from 300 to 350 cP.

In one or more embodiments of the present disclosure, the geopolymer slurry has a yield point of from 1 to 70 lbf/100 ft$^2$. The yield point represents the shear stress less than which the geopolymer slurry behaves as a rigid body and greater than which the geopolymer slurry flows as a viscous fluid. In other words, the yield point represents the amount of stress required to move the geopolymer slurry from a static condition. The yield point is the resistance of initial flow of a fluid, or the stress required in order to move the fluid. It can be simply stated that the yield point is the attractive force among colloidal particles in cement slurry. The yield point of a geopolymer slurry is correlated with the capacity of the geopolymer slurry to carry rock cuttings through the annulus, which in simplified terms indicates the geopolymer slurry's hole-cleaning ability. The determination of yield points of a geopolymer slurry is important in the overall description of slurry flow properties. Yield point affects both the start-up pressure after a temporary shutdown and the void filling properties of geopolymer slurry during cementing operations. The yield point of the geopolymer slurry may be estimated from the plastic viscosity from Equation 4 according to the following equation:

$$YP = \theta_{300} - PV \qquad (6)$$

In one or more embodiments of the present disclosure, the geopolymer slurry of the present disclosure has a yield point of from 5 to 60 lbf/100 ft$^2$, from 5 to 55 lbf/100 ft$^2$, from to 40 lbf/100 ft$^2$, from 5 to 30 lbf/100 ft$^2$, from 5 to 25 lbf/100 ft$^2$, from 5 to 20 lbf/100 ft$^2$, from 5 to 15 lbf/100 ft$^2$, from 5 to 10 lbf/100 ft$^2$, from 10 to 70 lbf/100 ft$^2$, from 10 to 60 lbf/100 ft$^2$, from 10 to 55 lbf/100 ft$^2$, from 10 to 40 lbf/100 ft$^2$, from 10 to 30 lbf/100 ft$^2$, from to 25 lbf/100 ft$^2$, from 10 to 20 lbf/100 ft$^2$, from 10 to 15 lbf/100 ft$^2$, from 15 to 70 lbf/100 ft$^2$, from 15 to 60 lbf/100 ft$^2$, from 15 to 55 lbf/100 ft$^2$, from 15 to 40 lbf/100 ft$^2$, from to 30 lbf/100 ft$^2$, from 15 to 25 lbf/100 ft$^2$, from 15 to 20 lbf/100 ft$^2$, from 20 to 70 lbf/100 ft$^2$, from 20 to 60 lbf/100 ft$^2$, from 20 to 55 lbf/100 ft$^2$, from 20 to 40 lbf/100 ft$^2$, from to 30 lbf/100 ft$^2$, from 20 to 25 lbf/100 ft$^2$, from 25 to 70 lbf/100 ft$^2$, from 25 to 60 lbf/100 ft$^2$, from 25 to 55 lbf/100 ft$^2$, from 25 to 40 lbf/100 ft$^2$, from 25 to 30 lbf/100 ft$^2$, from 30 to 70 lbf/100 ft$^2$, from 30 to 60 lbf/100 ft$^2$, from 30 to 55 lbf/100 ft$^2$, from 30 to 40 lbf/100 ft$^2$, from 40 to 70 lbf/100 ft$^2$, from 40 to 60 lbf/100 ft$^2$, from 40 to 55 lbf/100 ft$^2$, from 55 to 70 lbf/100 ft$^2$, from 55 to 60 lbf/100 ft$^2$, or from 60 to 70 lbf/100 ft$^2$.

As described above, the geopolymer slurry may have various properties that enable pumping the geopolymer slurry to a location and cementing. For example, the geopolymer slurry may be formulated to have a specific thickening time, density, free fluid values, plastic viscosity, and yield point, among others.

In one or more embodiments of the present disclosure, the geopolymer slurry is pumped to a well, a wellbore, an annulus, or other downhole locations for cementing. Cementing is performed when the geopolymer slurry is deployed into the well via pumps, displacing the drilling fluids still located within the well, and replacing them with the geopolymer slurry. The geopolymer slurry flows to the bottom of the wellbore through the casing, which will eventually be the pipe through which the hydrocarbons flow to the surface. From there, the geopolymer slurry fills in the space between the casing and the actual wellbore, and hardens. This creates a seal so that outside materials cannot enter the well flow, as well as permanently positions the casing in place.

In one or more embodiments, the properties of the geopolymer slurry are tailored to a specific well environment. This may be done by measuring the diameter of the borehole along its depth, using a caliper log. Utilizing both mechanical and sonic means, multi-finger caliper logs measure the diameter of the well at numerous locations simultaneously in prepared overnight in 6-10 M sodium silicate obtained from Halliburton, lime was obtained from Halliburton, and silica fume was obtained from Halliburton.

A red mud sample was homogenized and manually ground to obtain a fine particle size. Then, 4 grams of red mud was mixed well and homogenized with 0.9 grams of a binder (Licowax C micropowder PM, Hoechstwax) and pressed with 20 tons of pressure to a pellet with 31 mm diameter. The mineralogical composition of the red mud was characterized by wavelength dispersive X-ray fluorescence (WDXRF) showed the following oxides: CaO (5.59%), $SiO_2$ (15.178%), $Al_2O_3$ (25.645%), $Fe_2O_3$ (30.74%), MgO (0.17%), and $K_2O$ (0.036%). The red mud sample was also characterized using elemental analysis, Table 1 shows the results.

TABLE 1

| | # of measurement | | | | |
|---|---|---|---|---|---|
| Element | 1 (wt. %) | 2 (wt. %) | 3 (wt. %) | 4 (wt. %) | 5 (wt. %) |
| O | 33.900 | 33.800 | 33.700 | 33.900 | 33.900 |
| Na | 33.300 | 33.500 | 33.600 | 33.800 | 33.870 |
| Fe | 11.900 | 11.800 | 11.300 | 11.470 | 11.340 |
| Al | 6.600 | 6.700 | 6.800 | 6.740 | 6.830 |
| Si | 3.800 | 3.800 | 3.900 | 3.890 | 3.920 |
| Ca | 3.100 | 3.100 | 3.000 | 3.037 | 3.010 |
| Ti | 3.000 | 3.000 | 3.000 | 2.990 | 2.970 |
| S | 2.100 | 2.000 | 2.100 | 2.090 | 2.100 |
| F | 0.800 | 0.800 | 1.000 | 0.980 | 0.960 |
| Cl | 0.300 | 0.400 | 0.400 | 0.403 | 0.370 |
| Sr | 0.100 | 0.100 | 0.142 | 0.140 | 0.139 |
| Zr | 0.100 | 0.100 | 0.135 | 0.132 | 0.130 |
| P | 0.090 | 0.090 | 0.097 | 0.092 | 0.095 |
| Mg | 0.070 | 0.080 | 0.074 | 0.068 | 0.070 |
| Cr | 0.060 | 0.050 | 0.058 | 0.057 | 0.060 |

| | # of measurement | | | | | |
|---|---|---|---|---|---|---|
| Element | 6 (wt. %) | 7 (wt. %) | 8 (wt. %) | 9 (wt. %) | 10 (wt. %) | Average (wt. %) |
| O | 33.800 | 33.800 | 33.960 | 33.900 | 33.900 | 33.856 |
| Na | 33.740 | 33.670 | 33.800 | 33.500 | 33.500 | 33.628 |
| Fe | 11.530 | 11.600 | 11.440 | 11.600 | 11.620 | 11.560 |
| Al | 6.720 | 6.750 | 6.720 | 6.729 | 6.850 | 6.744 |
| Si | 3.915 | 3.906 | 3.890 | 3.913 | 3.932 | 3.887 |
| Ca | 3.053 | 3.080 | 3.060 | 3.104 | 3.036 | 3.058 |
| Ti | 2.972 | 2.980 | 3.020 | 2.984 | 3.024 | 2.994 |
| S | 2.124 | 2.080 | 2.087 | 2.167 | 2.094 | 2.094 |
| F | 1.100 | 0.954 | 0.944 | 0.963 | 0.917 | 0.942 |
| Cl | 0.390 | 0.396 | 0.385 | 0.411 | 0.424 | 0.388 |
| Sr | 0.140 | 0.142 | 0.142 | 0.142 | 0.142 | 0.133 |
| Zr | 0.130 | 0.132 | 0.132 | 0.131 | 0.131 | 0.125 |
| P | 0.090 | 0.097 | 0.096 | 0.100 | 0.096 | 0.094 |
| Mg | 0.072 | 0.070 | 0.077 | 0.073 | 0.073 | 0.073 |
| Cr | 0.060 | 0.058 | 0.057 | 0.058 | 0.057 | 0.058 | order to accommodate for irregularities in the wellbore diameter and determine the volume of the openhole. Additionally, the required physical properties of the geopolymer slurry are essential before commencing cementing operations. The proper set geopolymer slurry may also be determined, including the density and viscosity of the material, before actually pumping the geopolymer slurry into the hole.

EXAMPLES

Referring to The FIGURE, exemplary compositions and methods were investigated. ExRed mud was obtained as a byproduct and waste product of aluminum production from Maadn, sodium hydroxide was obtained from Fisher and For the preparation method of the geopolymer slurry, the quantities are used based on the following molar ratios:
1—$SiO/Al_2O_3$=a Si/Al molar ratio of 2 to 4. The $SiO_2$ amount was increased by the addition of silica fume. This is important to produce a geopolymer with good strength.
2—($Na_2O$, NaOH solution)/$Al_2O_3$ in red mud=a Na/Al molar ratio of 1 to 0.4
3—($Na_2O/SiO_2$) in Sodium Silicate=a $SiO_2$:$Na_2O$ molar ratio of 3.4:1

The NaOH 6M aqueous solution was prepared by dissolving NaOH in water, stirring for 10 to 30 minutes, and allowing the solution to cool overnight. $Na_2SiO_3$ is used as a solution. The pH of the activated solution was 11.6-13. Table 2 shows the compositions of Formulations 1-4.

TABLE 2

| Component | Formulation 1 | Formulation 2 | Formulation 3 | Formulation 4 |
|---|---|---|---|---|
| Distilled Water | 140 mL | 140 mL | 140 mL | 140 mL |
| NaOH | 82 mL | 82 mL | 82 mL | 82 mL |
| Sodium Silicate | 130 mL | 130 mL | 130 mL | 130 mL |
| Lime | — | — | 10 g (3.3%) | 20 g (6.6%) |
| Red Mud | 300 g | 300 g | 300 g | 300 g |
| Silica Fume | 90 g | 150 g | 90 g | 90 g |

Table 3 shows rheology test results for Formulation 1 at room temperature, Formulation 1 after 1 hour at 180° F., and Formulation 2 at room temperature. As shown below, the rheology values of Formulation 1 increased after conditioning, that is thickening, for 1 hour at 180° F. as opposed to thickening for 1 hour at room temperature. This shows that the thickening time may be decreased by increasing the temperature. Larger rheology values indicate gel formation. Table 3 also shows that increasing the amount of silica fume (Formulation 2) may also be used to shorten thickening times and accelerate formation of the gel.

TABLE 3

| Rheology | Formulation 1 | Formulation 1 | Formulation 2 |
|---|---|---|---|
| 600 | 42 | 63 | 88 |
| 300 | 25 | 48 | 46 |
| 200 | 16-18 | 42 | 32 |
| 100 | 11 | 36 | 21 |
| 6 | 2 | 22 | 4 |
| 3 | 2 | 14 | 3 |
| 10 seconds | 5 | 15 | 4 |
| 10 minuets | 9 | 25 | 12 |
| Free fluid in 250 mL graduated cylinder for 2 hours | 0 mL | 0 mL | 0 mL |
| Note | At room temperature | After 1 hour at 180° F. | At room temperature |

Table 4 shows the silica fume addition. The silica fume was added directly to the geopolymer slurry after the red mud addition.

TABLE 4

| Silica Fume Addition | 30% | 50% |
|---|---|---|
| Thickening Time | 6 hrs | 4-6 hrs |
| Free fluid in 250 ml graduated cylinder for 2 hours | 0 ml | 0 ml |
| Crushing Test | below 500 psi | 650-700 psi |

After conditioning for 1 hour at 180° F., Formulations 3 and 4 showed strong gelling and clear initial setting, while remaining capable of pumping. After conditioning for 24 hours at 180° F. and cooling for two days, Formulation 2 solidified. Table 4 also shows that greater amounts of silica fume can increase the compressive strength of the resulting gel, as evidenced by a Crushing Test value of greater than 500 psi, while remaining capable of pumping before thickening, as evidenced by the free fluid values of zero.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition for well cementing comprising a geopolymer slurry comprising a homogeneous mixture of:
ground red mud, wherein the ground red mud comprises $Al_2O_3$ and $SiO_2$ and has a fine particle size, wherein the fine particle size is characterized by 80% of the ground red mud having a particle size of 50 μm or less;
an alkaline activator comprising sodium silicate with a molar ratio of $SiO_2$ to $Na_2O$ of 3.4 to 1, wherein the alkaline activator has a pH of 12-13;
an aqueous solvent in an amount of from 10% to 70% by weight of the ground red mud; and
a $SiO_2$ source material, present in an amount to produce a Si/Al ratio in the geopolymer slurry of from 2 to 6, wherein the $SiO_2$ source material is selected from the group consisting of silica fume, cement, nanosilica, and fine sand having an average particle size of 150 μm or less, wherein the cement excludes ordinary portland cement;
wherein the $Al_2O_3$ in the ground red mud, the $SiO_2$ in the ground red mud, the alkaline activator, the aqueous solvent, and the $SiO_2$ source material form a gel by a geopolymerization reaction, under reaction conditions comprising a temperature of 100° F. to 180° F. with a thickening time of 1 to 6 hours, wherein the geopolymerization reaction comprises a polycondensation reaction of mixed hydroxyl ions formed from dissolution of $Al_2O_3$ and $SiO_2$ of the geopolymer slurry under alkaline conditions.

2. The composition of claim 1, wherein the aqueous solvent comprises one or more waters selected from the group consisting of deionized water, tap water, fresh water, municipal water, formation water, produced water, well water, filtered water, distilled water, sea water, salt water, natural brine, synthetic brine, or a combination thereof.

3. The composition of claim 1, further comprising an additive selected from the group consisting of accelerators, retarders, extenders, weighting agents, fluid loss control agents, lost circulation control agents, surfactants, antifoaming agents, elastomers, fibers, or combinations thereof.

4. A method of cementing, the method comprising:
pumping a geopolymer slurry into a location to be cemented,
wherein the geopolymer slurry comprises a homogeneous mixture of:
ground red mud, wherein the ground red mud comprises $Al_2O_3$ and $SiO_2$ and has a fine particle size, wherein the fine particle size is characterized by 80% of the ground red mud having a particle size of 50 μm or less;
an alkaline activator comprising sodium silicate with a molar ratio of $SiO_2$ to $Na_2O$ of 3.4 to 1, wherein the alkaline activator has a pH of 12-13;
an aqueous solvent in an amount of from 10% to 70% by weight of the ground red mud; and
a $SiO_2$ source material, present in an amount to produce a Si/Al ratio in the geopolymer slurry of from 2 to 6, wherein the $SiO_2$ source material is selected from the group consisting of silica fume, cement, nanosilica, and fine sand having an average particle size of 150 μm or less, wherein the cement excludes ordinary portland cement;
reacting the $Al_2O_3$ in the ground red mud, the $SiO_2$ in the ground red mud, the alkaline activator, the aqueous solvent, and the $SiO_2$ source material by a geopolymerization reaction to form a gel, under reaction conditions comprising a temperature of 100° F. to 180° F. with a thickening time of 1 to 6 hours, wherein the geopolymerization reaction comprises a polycondensation reaction of mixed hydroxyl ions formed from dissolution of $Al_2O_3$ and $SiO_2$ of the geopolymer slurry under alkaline conditions; and hardening the gel to form a cement;

wherein the location to be cemented is a well, a well bore, or a well bore annulus.

5. The method of claim 4, wherein hardening the gel comprises exposing the gel to conditions of the location to be cemented.

6. The method of claim 4, wherein the aqueous solvent comprises one or more waters selected from the group consisting of deionized water, tap water, fresh water, municipal water, formation water, produced water, well water, filtered water, distilled water, sea water, salt water, natural brine, synthetic brine, or a combination thereof.

7. The method of claim 4, wherein the geopolymer slurry further comprises an additive selected from the group consisting of accelerators, retarders, extenders, weighting agents, fluid loss control agents, lost circulation control agents, surfactants, antifoaming agents, elastomers, fibers, or combinations thereof.

* * * * *